United States Patent
Laget et al.

(10) Patent No.: US 10,294,876 B2
(45) Date of Patent: May 21, 2019

(54) METHOD OF INJECTING FUEL INTO THE COMBUSTION CHAMBER OF AN INTERNAL-COMBUSTION ENGINE RUNNING IN SINGLE-FUEL OR MULTI-FUEL MODE

(71) Applicant: IFP Energies nouvelles, Rueil-Malmaison (FR)

(72) Inventors: Olivier Laget, Rueil-Malmaison (FR); Stéphane Richard, Bazainville (FR); Lionel Martinez, Vaulnaveys le Bas (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 15/301,339

(22) PCT Filed: Mar. 19, 2015

(86) PCT No.: PCT/EP2015/055843
§ 371 (c)(1),
(2) Date: Sep. 30, 2016

(87) PCT Pub. No.: WO2015/150103
PCT Pub. Date: Oct. 8, 2015

(65) Prior Publication Data
US 2017/0114730 A1    Apr. 27, 2017

(30) Foreign Application Priority Data

Apr. 3, 2014 (FR) ..................... 14 52955

(51) Int. Cl.
*F02D 19/06* (2006.01)
*F02D 19/10* (2006.01)
(Continued)

(52) U.S. Cl.
CPC ...... *F02D 19/0689* (2013.01); *F02B 23/0651* (2013.01); *F02B 23/0669* (2013.01);
(Continued)

(58) Field of Classification Search
CPC ...... F02B 9/02; F02B 17/005; F02B 23/0651; F02B 23/0669; F02B 23/0672;
(Continued)

(56) References Cited

U.S. PATENT DOCUMENTS 2,040,972 A * 5/1936 Becker ............ F02F 3/22
123/41.35
5,771,847 A * 6/1998 Duva ............ F02B 45/06
123/1 A
(Continued)

FOREIGN PATENT DOCUMENTS

DE  10 2011 017479 A1  10/2012
FR     3012523 A1       5/2015
(Continued)

OTHER PUBLICATIONS

International Search Report for PCT/EP2015/055843 dated Jul. 30, 2015; English translation submitted herewith (6 Pages).

*Primary Examiner* — John Kwon
*Assistant Examiner* — Johnny H Hoang
(74) *Attorney, Agent, or Firm* — Fitch, Even, Tabin & Flannery LLP

(57) ABSTRACT

The present invention is a fuel injection method for a compression-ignition internal-combustion engine running in single-fuel or multi-fuel mode. The method, in a single-fuel mode, injects liquid fuel (Fuel1) into lower zone (Z1) and/or upper zone (Z2) of the combustion chamber and, in a multi-fuel mode, provides in the chamber mixing of an (Continued)

oxidizer with another fuel (Fuel2) and injection of liquid fuel (Fuel1) into lower zone (Z1) or both zones (Z1, Z2) of the combustion chamber.

19 Claims, 3 Drawing Sheets

(51) Int. Cl.
    *F02D 41/00*      (2006.01)
    *F02M 61/18*      (2006.01)
    *F02B 23/06*      (2006.01)
    *F02B 43/10*      (2006.01)

(52) U.S. Cl.
    CPC ...... *F02B 23/0672* (2013.01); *F02B 23/0693* (2013.01); *F02B 43/10* (2013.01); *F02D 19/0647* (2013.01); *F02D 19/0652* (2013.01); *F02D 19/10* (2013.01); *F02D 41/0025* (2013.01); *F02D 41/0027* (2013.01); *F02M 61/182* (2013.01); *F02D 19/0655* (2013.01); *F02D 19/0692* (2013.01); *Y02T 10/125* (2013.01); *Y02T 10/36* (2013.01)

(58) Field of Classification Search
    CPC .............. F02B 23/0687; F02B 23/0693; F02B 23/0696; F02M 61/14; F02M 61/1806; F02M 61/1813; F02M 61/182; F02M 45/086; F02F 1/242; F02F 3/26; Y02T 10/125; Y02T 10/36
    USPC ... 123/1 A, 27 GE, 275, 276, 290, 294, 298, 123/301, 305, 307, 525–527, 575
    See application file for complete search history.

(56) References Cited

U.S. PATENT DOCUMENTS

| | | | | |
|---|---|---|---|---|
| 6,659,071 | B2 * | 12/2003 | LaPointe | F02B 1/12 123/295 |
| 7,185,614 | B2 * | 3/2007 | Meffert | F02B 23/0672 123/269 |
| 7,287,509 | B1 * | 10/2007 | Brehob | F02D 41/0025 123/1 A |
| 8,327,822 | B2 * | 12/2012 | Asai | F02B 23/0651 123/298 |
| 8,677,970 | B2 * | 3/2014 | Venugopal | F02B 23/0651 123/193.1 |
| 9,284,877 | B2 * | 3/2016 | Yoo | F02B 23/0696 |
| 9,429,065 | B2 * | 8/2016 | Zoeller | F02B 23/0651 |
| 2003/0097997 | A1 * | 5/2003 | Lynch | F02B 43/00 123/27 GE |
| 2005/0120995 | A1 * | 6/2005 | Tsujimoto | F02B 23/0669 123/299 |
| 2005/0224606 | A1 | 10/2005 | Dingle | |
| 2009/0194081 | A1 * | 8/2009 | Ito | F02B 69/02 123/575 |
| 2014/0048036 | A1 | 2/2014 | Zoeller et al. | |
| 2015/0020765 | A1 * | 1/2015 | Pierpont | F02F 3/28 123/27 R |
| 2016/0341106 | A1 * | 11/2016 | Richard | F02M 45/086 |

FOREIGN PATENT DOCUMENTS

| | | |
|---|---|---|
| WO | 01/86128 A2 | 11/2001 |
| WO | 2013/016713 A2 | 1/2013 |

* cited by examiner

METHOD OF INJECTING FUEL INTO THE COMBUSTION CHAMBER OF AN INTERNAL-COMBUSTION ENGINE RUNNING IN SINGLE-FUEL OR MULTI-FUEL MODE

CROSS REFERENCE TO RELATED APPLICATIONS

Reference is made to International Application No. PCT/2015/055843 filed Mar. 19, 2015, and French Application No. 14/52.955 filed Apr. 3, 2014, which applications are incorporated herein by reference in their entirety.

BACKGROUND OF THE INVENTION

Field of the Invention

The present invention relates to a method of injecting fuel into the combustion chamber of an internal-combustion engine, in particular a compression-ignition engine. More particularly the invention is a fuel injection method for an engine used in the aeronautic or road applications, or in the field of stationary equipments such as electrical power generators.

Description of the Prior Art

This type of engine generally comprises at least a cylinder, a piston provided with a projection defined in a concave bowl and which slides in the cylinder in a reciprocating rectilinear motion, an intake for an oxidizer, a burnt gas exhaust, a combustion chamber and an injection system for injecting fuel into the combustion chamber.

For the design of an engine, requirements relative to performance, pollution emissions and mechanical strength of the combustion chamber are increasing while the mechanisms for meeting them are decreasing.

Indeed, performance increase generally leads to an increase in emissions and to higher mechanical stress.

These drawbacks need to be overcome to guarantee limited emissions and satisfactory mechanical strength over the entire operating range of the engine, in particular at very high load. In particular for reducing emissions, using all of the oxidizer present in the combustion chamber is of great importance.

The problem is that the fuel remains confined in the bowl and it cannot mix with the oxidizer contained notably in the compression area, that is the volume in the upper part of the combustion chamber defined by the cylinder wall and the face of the cylinder head opposite the piston.

This involves the drawback of creating areas of high fuel richness in the combustion chamber which generate a high production of soots, carbon monoxide (CO) and unburnt hydrocarbons (HC) during combustion of this fuel mixture.

In order to overcome these drawbacks, and as better described in French patent application No. 13/60,427 filed by the applicant, an internal-combustion engine comprising fuel injection with jets having at least two sheet angles and a piston comprising a bowl provided with a projection with two combustion zone volumes and internal aerodynamics substantially which improves the combustion quality is used.

As a result a larger amount of oxidizer is used in comparison with conventional engines and the thermal load is distributed over a larger surface area of the combustion chamber.

Indeed, the constant commitment to global greenhouse gas and pollution (notably particles) emissions reduction leads to consideration of the increased use of alternative fuels, such as natural gas or biofuels, for powering combustion engines.

It is therefore necessary to adapt the combustion system to this type of fuel so as to enable optimum use thereof because the properties of these alternative fuels are substantially different from those of conventional fuels. Notably, the combustion rate of these alternative fuels is lower than with more conventional fuels, which causes too slow and an incomplete combustion which generates the emission of pollutants such as unburnt hydrocarbons.

It is therefore necessary to perfect the combustion to be as complete as far as possible. One option uses a known combustion that is conducted in two modes which are a mode known as single-fuel mode where a single fuel is used and a mode known as multi-fuel mode allowing several fuels of different nature to be associated and combined.

Generally, the fuel used for running in single-fuel mode is a fuel in liquid form (referred to as Fuel1 in the description hereafter), such as diesel fuel, but any other type of liquid fuel such as ethanol or a biofuel can be used. For running in multi-fuel mode, another fuel in gas state, such as CNG (Compressed Natural Gas), LPG (Liquefied Petroleum Gas), a biogas or any other liquid fuel having sufficient volatile properties to be completely vaporized prior to combustion initiation, such as gasoline for example (referred to as Fuel2 hereafter), is associated with liquid fuel Fuel1.

Thus, two combustion modes are present in the same engine cycle, conventional combustion through self-ignition of the diesel fuel and combustion of the much more inert air/gas mixture through propagation of a flame front initiated by a pilot self-ignition of the diesel fuel. In the latter mode, a small amount of diesel fuel thus serves to initiate the combustion of a gaseous fuel mixture.

SUMMARY OF THE INVENTION

The method of the invention further improves the aforementioned drawbacks by improving the combustion even further.

The applicant has particularly developed this two-mode combustion by enabling use thereof for operation at high engine loads and/or speeds, while reducing emissions even further.

Furthermore, these combustion modes also allow reduction of the fuel consumption, to obtain a better engine behavior in transient phases (cold run or accelerations for example) while maintaining an acceptable emissions level for some pollutants (carbon monoxide, unburnt hydrocarbons).

The invention therefore relates to a fuel injection method for a compression-ignition internal-combustion engine running in single-fuel or multi-fuel mode and comprising at least a cylinder, a piston sliding in this cylinder, a combustion chamber comprising two mixing zones Z1, Z2 and defined on one side by the upper face of the piston comprising a projection extending in the direction of the cylinder head and arranged in the center of a concave bowl, and a cylinder head carrying fuel injection projecting liquid fuel in at least two fuel jet sheets with different sheet angles, a lower sheet for zone Z1 and an upper sheet for zone Z2, an intake for an oxidizer and burnt gas exhaust which for single-fuel mode, injects liquid fuel into lower zone Z1 and/or upper zone Z2 of the combustion chamber and, in multi-fuel mode, provides the chamber with mixing of an oxidizer with another fuel and in injecting liquid fuel into lower zone Z1 or into both zones Z1 and Z2 of the combustion chamber.

The method can inject a liquid fuel with physicochemical characteristics allowing operation of the compression-ignition engine, such as diesel fuel, ethanol or a biofuel.

The method can feed a gaseous fuel into the combustion chamber through the pipe of the intake to achieve an oxidizer/fuel mixture.

The method can inject a gaseous fuel in a form of CNG (Compressed Natural Gas), LPG (Liquefied Petroleum Gas) or biogas.

The method can inject into the combustion chamber a liquid fuel having volatility characteristics allowing vaporization prior to combustion initiation so as to achieve an oxidizer/fuel mixture.

The method can inject gasoline.

The method can for the single-fuel mode, inject the same mass of liquid fuel through the two sheets into the oxidizer present in the two zones of the combustion chamber.

The method can, for the single-fuel mode, inject through the two jet sheets a different mass of liquid fuel into the oxidizer present in each zone.

The method can, for the multi-fuel mode, inject, through the lower jet sheet, liquid fuel into the oxidizer/fuel mixture present in the lower zone of the combustion chamber.

The method can, for the multi-fuel mode, inject, through the two jet sheets, liquid fuel into the oxidizer/fuel mixture present in the two zones of the combustion chamber.

The method can inject through the two jet sheets a different mass of liquid fuel into the oxidizer/fuel mixture present in each zone.

The method can inject through the two jet sheets the same mass of liquid fuel into the oxidizer/fuel mixture present in each zone.

The method can manage the injection as a function of the engine running parameters, notably the load and the speed of this engine.

BRIEF DESCRIPTION OF THE DRAWINGS

Other features and advantages of the invention will be clear from reading the description hereafter, given by way of non-limitative example, with reference to the accompanying figures wherein.

DETAILED DESCRIPTION OF THE INVENTION

Figure 1:
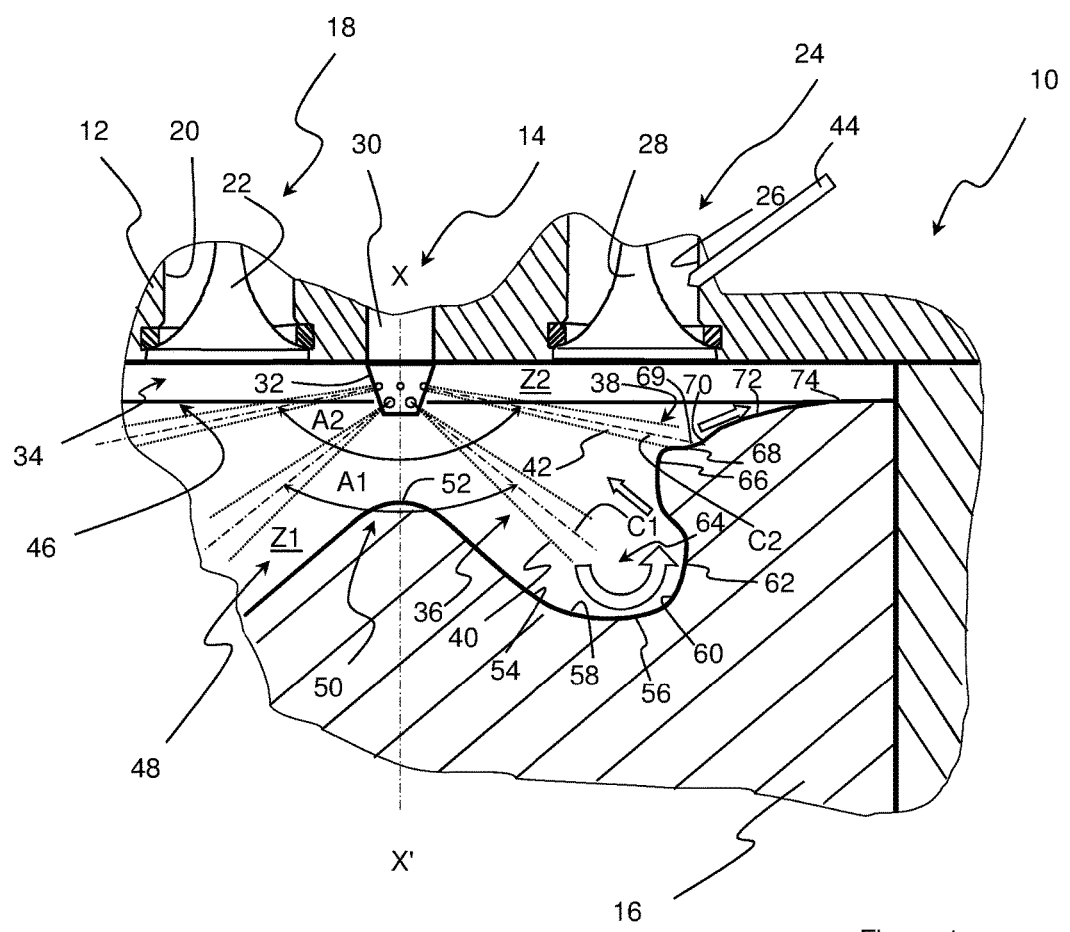
FIG. 1 is a diagram showing a partial view of an internal-combustion engine using the method according to the invention.

With reference to FIG. 1, a compression-ignition internal-combustion engine with direct and possibly indirect fuel injection, as illustrated by way of non-limitative example in FIG. 1, comprises at least a cylinder 10, a cylinder head 12 closing the cylinder in the upper part, direct liquid fuel (Fuel1) injection 14, gaseous or liquid fuel (Fuel2) injection and a piston 16 having an axis XX' sliding in the cylinder with a reciprocating rectilinear motion.

In the non-limitative example of FIG. 1, indirect gaseous fuel injection 15 carried by the cylinder head are provided for fuel Fuel2.

Liquid fuel Fuel1 is understood to be a fuel such as diesel fuel, ethanol, a biofuel or any other fuel with the physicochemical characteristics allowing operation of an engine of compression-ignition type including a direct injection system for liquid fuel Fuel1.

Fuel2 can be a gaseous fuel, such as CNG (Compressed Natural Gas), LPG (Liquefied Petroleum Gas), a biogas or any other fuel having sufficient volatile properties to be completely vaporized prior to combustion initiation (fuel of gasoline type for example), associated with this liquid fuel of Fuel1 type.

This engine also comprises a burnt gas exhaust 18 with at least one exhaust pipe 20 whose opening can be controlled by any device such as, for example, an exhaust valve 22, and an intake 24 for an oxidizer with at least one intake pipe 26 whose opening can be controlled by any device such as for example an intake valve 28.

The intake can be designed to admit the oxidizer with a predetermined aerodynamic level (swirl and/or tumble ratio). The intake can therefore have a specific intake pipe geometry.

In the example described, the oxidizer is air at ambient pressure or supercharged air or a mixture of air (supercharged or not) and recirculated exhaust gas readmitted in the combustion chamber.

The direct injection comprises at least one liquid fuel injector 30 for fuel Fuel1, preferably arranged along axis XX' of the piston, whose nozzle 32 comprises a multiplicity of orifices through which the fuel is sprayed and projected in the direction of combustion chamber 34 of the engine.

It is from this injection that the projected fuel forms at least two fuel jet sheets. In this example two sheets 36 and 38 of fuel jets 40 and 42 are formed which have a general axis in common with an axis that of piston 16 and being axially positioned one above the other.

More precisely, sheet 36, that is the closer to piston 16, is referred to as the lower sheet in the description below and sheet 38, that is further away from the piston, is referred to as the upper sheet.

As can be seen in FIG. 1, these two sheets form sheet angles A1 and A2 different from one another. A sheet angle is understood to be the top angle formed by the cone originating from the injector, whose imaginary peripheral wall passes through all the axes C1 or C2 of jets 40 or 42.

Advantageously, sheet angle A1 of the lower sheet is at most equal to 130° and preferably ranges between 105° and 130°, while sheet angle A2 of the upper sheet is at most equal to 180° and preferably ranges between 155° and 180°.

Of course, it is possible for the fuel Fuel1 injection to not be positioned along axis XX'. But in this case the general axis of the fuel jet sheets from the fuel injector is at least substantially parallel to this axis XX'.

Similarly, it is possible for each sheet to be carried by a distinct injector (single-sheet injector) with dedicated targeting in distinct zones of the combustion chamber.

The fuel injection for fuel Fuel2, which is indirect injection 15, for the non-limitative example illustrated in FIG. 1, comprise at least one fuel injector 44 arranged on intake pipe 26 in order to inject fuel therein so that it mixes with the oxidizer circulating within.

In the case of a fuel Fuel2 in liquid form with high volatility properties, the injection is direct injection arranged on the cylinder head, allowing fuel to be injected into the combustion chamber which is totally vaporized prior to combustion initiation and providing optimum mixing with the oxidizer.

Combustion chamber 34 is defined by the inner face of cylinder head 12 opposite the piston, the circular inner wall of cylinder 10 and the upper face 46 of piston 16.

This upper face of the piston comprises a concave bowl 48, whose axis is in common with that of the cylinder, having concavity directed towards the cylinder head and which houses a projection 50 arranged substantially in the center of the bowl, which rises towards cylinder head 12, and being preferably coaxial with the axis of the fuel sheets from injector 30.

Of course, it is possible for the axis of the bowl not to be coaxial with that of the cylinder. The main thing is the layout according to which the axis of the fuel jet sheet, the axis of the projection and the axis of the bowl are preferably in common.

Projection 50, having truncated general shape, comprises a preferably rounded top 52 which extends, while moving symmetrically away from axis XX' towards the outside of piston 16, by a substantially rectilinear inclined flank 54 down to a bottom 56 of the bowl.

In the example of FIG. 1, the bottom of this bowl is rounded, with a concave rounded surface 58, referred to as inner rounded surface, connected to the bottom of inclined flank 54. Another concave rounded surface 60, which is referred to as outer rounded surface is connected at one end to the lower end of the inner rounded surface and at the other end to a lateral wall 62, which is substantially vertical.

The two rounded surfaces 58 and 60 thus define the lower part of a toroidal volume, which is a torus having a substantially cylindrical section 64.

Lateral wall 62 extends, when moving away from axis XX', as a convex rounded surface 66, which is referred to as re-entrant, which extends to an inclined plane 68 linked to a concave inflection surface 69 connected to a substantially plane surface 70. This plane surface continues to an outer convex surface 72 that extends to a plane surface 74 which extends up to a vicinity of the cylinder wall.

Combustion chamber 34 comprises two distinct zones Z1 and Z2 where mixing of fuel Fuel1 injected through injector 30 into the oxidizer (air, supercharged or not, or mixture of air and recirculated burnt gas) and/or into the fuel mixture (oxidizer and Fuel2 mixture), occur as well as combustion of the fuel mixture, occurs as described below.

Zone Z1, which is defined by projection 48, torus 64 at the bowl bottom, wall 62 and convex rounded surface 66, forms the lower zone of the combustion chamber associated with lower sheet 36 of fuel jets of axis C1. Zone Z2, is defined by inclined plane 68, concave surface 69, substantially plane surface 70, convex surface 72, plane surface 74. The peripheral inner wall of the cylinder and cylinder head 12 forms the upper zone of this chamber associated with upper sheet 38 of fuel jets of axis C2.

The combustion chamber is thus separated in several zones (two zones here) that are associated with an injection of fuel Fuel1 and are concerned with combustion depending on the operating mode and the engine load.

Thus, such an operating mode allows obtaining fast and complete combustion with a good efficiency and low soot, CO and HC emissions in conventional mode at very high load.

Furthermore, the heat flux distribution between the piston and the cylinder head is optimized notably by the increased volume of zone Z2 in relation to a conventional piston.

The interaction between the fuel jets and the face of the piston enables increased cooling of this piston, thus decreasing the thermal stresses it is subjected to even further.

The Fuel1 injector also allows introduction of different injected fuel masses, different injection durations and times between the sheets to provide optimum exploitation of the oxidizer and/or of the fuel mixture (oxidizer/Fuel2 mixture) located in the lower zone as well as the upper zone.

The invention thus allows injection of fuel either into both zones or into one or the other, and thus providing mixing with the oxidizer to achieve combustion of the fuel mixture present in the chamber.

It also allows the engine to run in multi-fuel mode, in dual-fuel mode here, using an oxidizer/Fuel2 mixture 80 present in the combustion chamber in homogeneous or quasi-homogeneous form, and to initiate combustion of the mixture either in both zones or in one of these zones.

Figure 2:
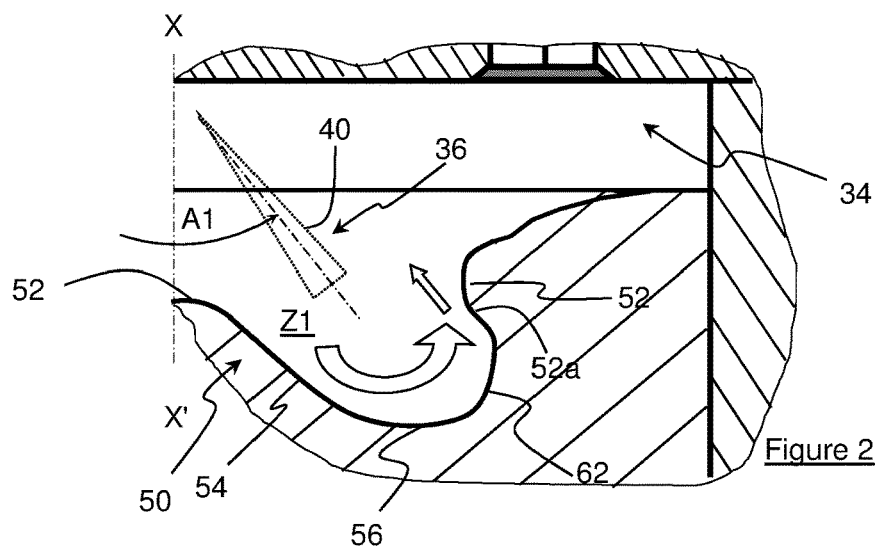
FIGS. 2 to 6 illustrate examples of operation of the engine according to FIG. 1.

FIG. 2 illustrates an operating mode of the engine on single-fuel with homogeneous combustion for low loads or partial loads.

The liquid fuel is therefore injected, in the vicinity of the top dead center of piston 16 during the compression phase, into the lower zone, zone Z1, of combustion chamber 34 using only fuel jets 40 of lower sheet 36 for mixing with the oxidizer admitted therein during the engine intake phase.

These late fuel injections advantageously have a flow direction tangential to top 52 and flank 54 of projection 50 ending on bottom 56, wall 62 and the lower part of re-entrant 66. This allows driving the oxidizer present in the center of the chamber below the injector and thus promoting mixing in lower zone Z1 of the chamber.

Figure 3:
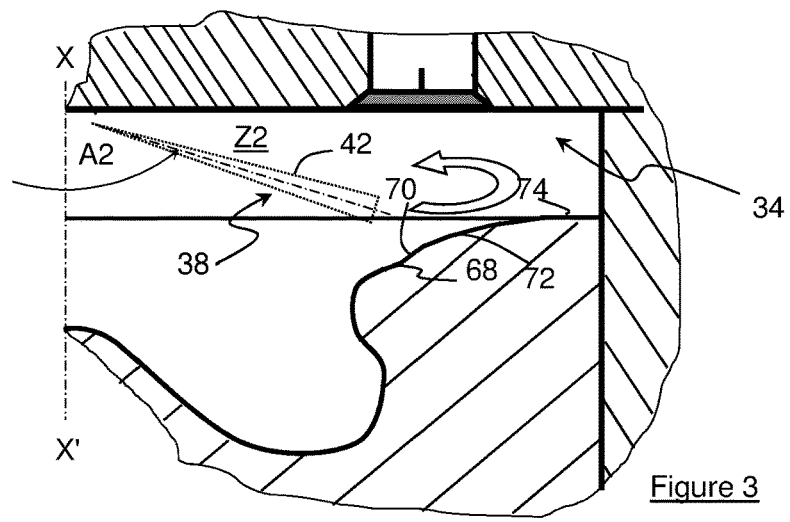

FIG. 3 illustrates another single-fuel mode having a fuel injection into upper zone Z2 of the combustion chamber bearing on surfaces 68, 70 and 72 of the piston for mixing with the oxidizer present in this zone.

This operating mode notably improves engine start-up using only fuel jets 42 of upper sheet 38, close to the glow plug with which this type of engine is usually equipped.

Indeed, one of the drawbacks of engines of the prior art relates to cold start-up since the extent of the jet sheet angle leads to drive these jets away from the glow plug. Besides, this sheet angle extent induces significant wetting of the cylinder wall, which is harmful to start-up. These two limitations are overcome with this operating mode involving a much more open sheet angle.

Figure 4:
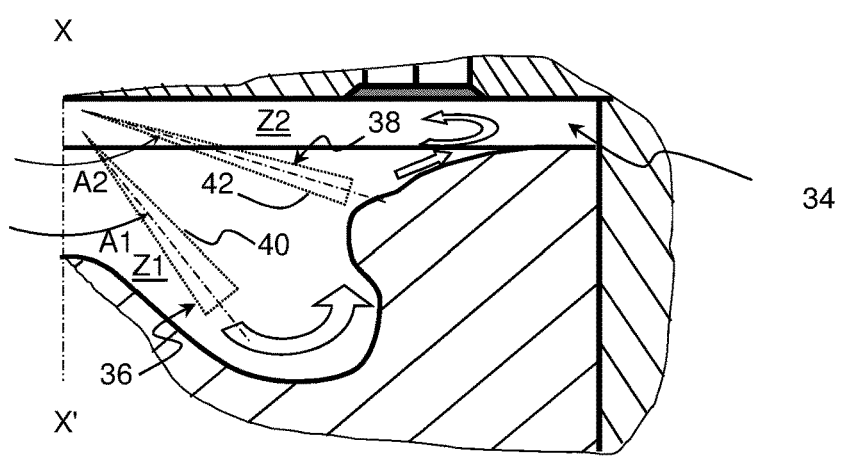

FIG. 4 illustrates the single-fuel running mode of the engine at high loads. For these high loads, the fuel is injected both into lower zone Z1 and upper zone Z2 of combustion chamber 34.

More precisely, fuel jets 40 of lower sheet 36 are directed towards zone Z1 while fuel jets 42 of upper sheet 38 are sent to zone Z2.

In these configurations, it is possible to inject a larger mass of fuel into lower zone Z1 of chamber 34 through the jets of lower sheet 36 and a smaller mass into upper zone Z2 through upper sheet 38, with possibly a phase lag between the injections.

Finally, injection of an identical mass of fuel into both zones Z1 and Z2 can also be considered.

Selection of the mass distribution among the two sheets needs to be done in accordance with the volumes of zones Z1 and Z2 and with the engine running mode which is selected.

The liquid fuel is thus optimally distributed among the lower zone and the upper zone of the combustion chamber in accordance with the volumes thereof at the injection time. Through this distribution, the local richness in each zone can be controlled and thus the production of pollutants such as NOx, CO, HC and soots can be limited.

Figure 5:
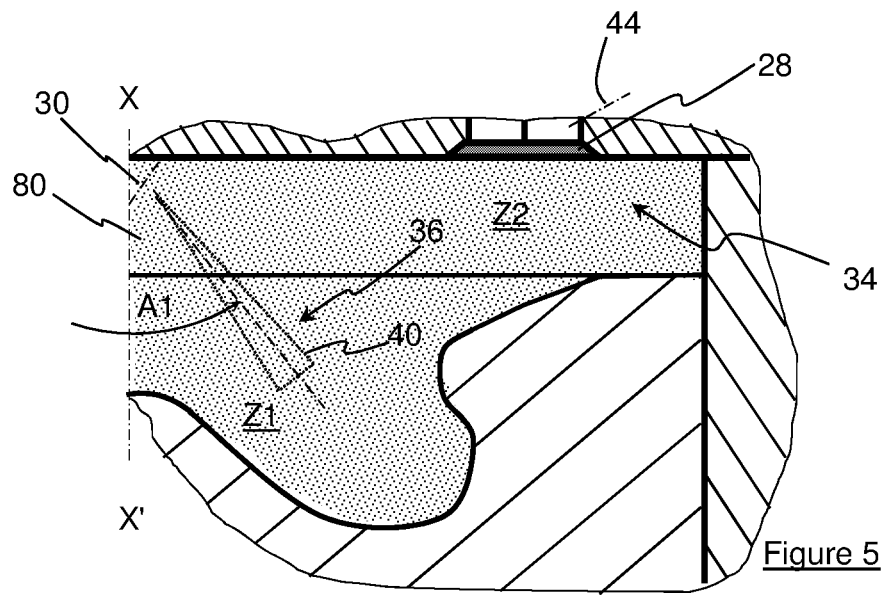
Figure 6:
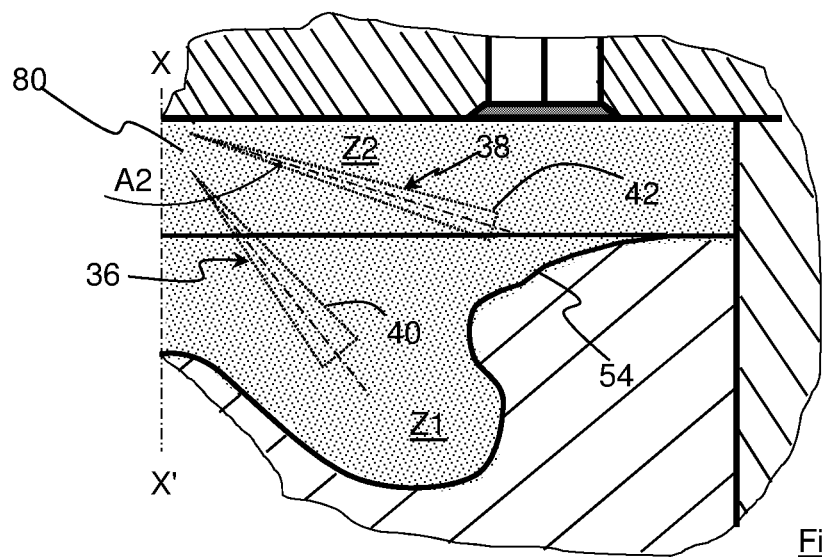

The examples illustrated in FIGS. 5 and 6 show the various multi-fuel configurations, dual-fuel here, which are used to limit emissions even further.

Therefore, during the engine intake phase, opening of intake valve 28 is controlled and Fuel2 injector 44 is operational for feeding fuel into the intake pipe.

Throughout the intake phase, oxidizer/Fuel2 mixture 80 fills almost all of combustion chamber 34 up to a position close to the bottom dead center of the piston which is a position where closing of the intake valve is controlled.

In the engine compression phase, the piston comes close to the top dead center thereof and injector 30 is controlled to inject liquid fuel Fuel1 either into lower zone Z1 or into both zones Z1 and Z2 where combustion of oxidizer/Fuel2 mixture 80 is initiated by the self-ignition of the fuel of Fuel1 type.

More precisely, as illustrated in FIG. 5, an injection of liquid fuel Fuel1 into oxidizer/Fuel2 mixture 80 of zone Z1 is performed using only fuel jets 40 of lower sheet 36 to initiate combustion of the fuel mixture present in this zone Z1. This combustion flame front propagates thereafter to the rest of zone Z1, then to zone Z2. This injection is notably achieved in an engine running mode with low load and low speed.

As shown in FIG. 6, for intermediate load points of the engine, a mass of liquid fuel is injected into zone Z1 through lower sheet 36 and another mass of liquid fuel is injected through upper sheet 38 into zone Z2. This second mass is less than the mass injected into zone Z1 (possibly with a non-zero phase lag between the injections).

An injection into the oxidizer/Fuel2 mixture of an identical mass of liquid fuel in both zones Z1 and Z2 is achieved through sheets 36 and 38 (possibly with a non-zero phase lag) for higher loads.

Finally, an injection of a large mass of liquid fuel Fuel1 into the oxidizer/Fuel2 mixture is achieved through sheet 38 in zone Z2 while an injection of a minor mass of liquid fuel is achieved through sheet 36 in zone Z1 (possibly with a non-zero phase lag), for example during the engine start-up phase.

Using a liquid fuel injection into both zones with a multiplicity of sheets with different sheet angles allows multiplying of the self-ignition points and thus extending the initial flame surface intended for initiating the combustion of the oxidizer/gaseous fuel mixture.

This allows the combustion to be initiated at the same time in both zones while promoting and accelerating the combustion of the oxidizer/gaseous fuel mixture, which is thus faster and more complete while limiting the generation of pollutants.

Thus, the invention allows different operating modes to be used either only with lower zone Z1 of the combustion chamber, or with the entire combustion chamber by associating the two zones. Switching from one mode to the other can be done in a continuous manner through management of the injection timing and of the masses injected in the various combustion zones.

More precisely, this management is controlled by a controller containing engine operating maps mapped according to the speed and load of the engine, through management of the fuel injection for the various fuels according to the engine load. This operation allows controlling the flow rates and the respective proportions of Fuel2/Fuel1 type fuel, the duration and/or the time of injection of fuels Fuel1 and/or Fuel2 and the ignition angles.

Furthermore, it is possible to optimize the initiation of the propagation flame combustion in the oxidizer/Fuel2 mixture by varying the injection timing and the amounts injected through the various fuel jet sheets, and therefore to overcome the lower combustion rate of alternative fuels that can be used as Fuel2 type fuel.

Thus, with at least two fuel jet sheets having two different sheet angles, combustion initiation and combustion are distributed in the entirety of the combustion chamber while optimizing the combustion of the oxidizer/Fuel2 mixture.

The invention claimed is:

1. A method of fuel injection in a compression-ignition-internal combustion engine which includes an intake, at least one cylinder, each cylinder including a cylinder head, a piston sliding in the cylinder, a combustion chamber with an upper mixing zone and a lower mixing zone, the mixing zones being defined on one side by an upper face of the piston including a projection extending toward the cylinder head and located in a center of a concave bowl, at least one fuel injector located in the cylinder head which injects liquid fuel at least as an upper sheet having an upper sheet angle into the upper mixing zone and as a lower sheet having a lower sheet angle into the lower mixing zone, an intake for an oxidizer and a burnt gas exhaust, the method comprising:
in a single fuel mode injecting the liquid fuel into at least one of the upper zone and the lower zone of the combustion chamber which is ignited by compression ignition;
in a multi-fuel mode simultaneously feeding a gaseous fuel comprising one of (CNG), (LPG) and biogas through the intake into the combustion chamber to provide a mixture of an oxidizer and a second fuel and injecting the liquid fuel into the lower zone or into both the upper and lower zones of the combustion chamber and self-ignition of the liquid fuel ignites the gaseous fuel during the multi-fuel mode.

2. A method as claimed in claim 1, comprising:
injecting liquid fuel having physical and chemical characteristics permitting operation of the compression-ignition engine, with one of diesel fuel, ethanol or a biofuel.

3. A method as claimed in any one of claim 2, comprising:
feeding a gaseous fuel into the combustion chamber through the intake to provide the mixture of the oxidizer and the second fuel.

4. A method as claimed in claim 1, comprising:
injecting a liquid fuel into the combustion chamber having volatility characteristics which vaporizes prior to initiation of combustion to achieve the mixture of oxidizer and the second fuel.

5. A method as claimed in claim 2, comprising:
injecting a liquid fuel into the combustion chamber having volatility characteristics which vaporizes prior to initiation of combustion to achieve the mixture of oxidizer and the second fuel.

6. A method as claimed in claim 4, comprising injecting gasoline.

7. A method as claimed in claim 5, comprising injecting gasoline.

8. A method as claimed in claim 1, comprising:
injecting during the single-fuel mode operation, an identical mass of liquid fuel in the upper and lower sheets into the oxidizer present in the upper and lower zones of the combustion chamber.

9. A method as claimed in claim 2, comprising:
injecting during the single-fuel mode operation, an identical mass of liquid fuel in the upper and lower sheets into the oxidizer present in the upper and lower zones of the combustion chamber.

10. A method as claimed in claim 1, comprising:
injecting during the liquid fuel the single-fuel mode, in the upper and lower sheets a different mass of the liquid fuel into the oxidizer present in the upper and lower zones.

11. A method as claimed in claim 2, comprising:
injecting during the liquid fuel the single-fuel mode, in the upper and lower sheets a different mass of the liquid fuel into the oxidizer present in the upper and lower zones.

12. A method as claimed in claim 1, comprising:
injecting during the multi-fuel mode, in the lower sheet, liquid fuel into the mixture of oxidizer and second fuel in the lower zone of combustion chamber.

13. A method as claimed in claim 2, comprising:
injecting during the multi-fuel mode, in the lower sheet, liquid fuel into the mixture of oxidizer and second fuel in the lower zone of combustion chamber.

14. A method as claimed in claim 1, comprising:
injecting during the multi-fuel mode, in the lower sheet, liquid fuel into the mixture of oxidizer and second fuel in the lower zone of combustion chamber.

15. A method as claimed in claim 1, comprising:
injecting, in the upper and lower sheets liquid fuel into the mixture of oxidizer and second fuel in the upper and lower zones of combustion chamber.

16. A method as claimed in claim 2, comprising:
injecting, in the upper and lower sheets liquid fuel into the mixture of oxidizer and second fuel in the upper and lower zones of combustion chamber.

17. A method as claimed in claim 5, comprising:
injecting in the upper and lower sheets a different mass of liquid fuel into oxidizer and second fuel present in the upper and lower zones.

18. A method as claimed in claim 6, comprising:
injecting in the upper and lower sheets a different mass of liquid fuel into oxidizer and second fuel present in the upper and lower zones.

19. A method as claimed in claim 1, comprising:
injecting in the upper and lower sheets an identical mass of liquid fuel into the mixture of oxidizer and first fuel in the upper and lower zones.

* * * * *